US010297287B2

(12) United States Patent
Maisenbacher et al.

(10) Patent No.: US 10,297,287 B2
(45) Date of Patent: May 21, 2019

(54) DYNAMIC MEDIA RECORDING

(71) Applicant: Thuuz, Inc., Palo Alto, CA (US)

(72) Inventors: Mark Kikuya Maisenbacher, Palo Alto, CA (US); David Eyler, San Francisco, CA (US)

(73) Assignee: Thuuz, Inc., Palo Alto, CA (US)

( * ) Notice: Subject to any disclaimer, the term of this patent is extended or adjusted under 35 U.S.C. 154(b) by 0 days.

(21) Appl. No.: 14/058,782

(22) Filed: Oct. 21, 2013

(65) Prior Publication Data
US 2015/0110461 A1 Apr. 23, 2015

(51) Int. Cl.
| | |
|---|---|
| *G11B 27/19* | (2006.01) |
| *H04N 5/91* | (2006.01) |
| *H04N 5/775* | (2006.01) |
| *G11B 27/34* | (2006.01) |
| *G06F 17/30* | (2006.01) |

(52) U.S. Cl.
CPC ........ *G11B 27/19* (2013.01); *G06F 17/30781* (2013.01); *G11B 27/34* (2013.01); *H04N 5/775* (2013.01); *H04N 5/91* (2013.01)

(58) Field of Classification Search
CPC ...... H04N 21/4532; H04N 5/775; H04N 5/91; G11B 27/34; G11B 27/19; G06F 17/30781
USPC .... 386/239–241, 248, 291, 278; 725/46, 47, 725/51, 58, 61
See application file for complete search history.

(56) References Cited

U.S. PATENT DOCUMENTS

| | | |
|---|---|---|
| 6,005,562 A | 12/1999 | Shiga et al. |
| 6,177,931 B1 | 1/2001 | Alexander et al. |
| 6,185,527 B1 | 2/2001 | Petkovic et al. |
| 6,195,458 B1 | 2/2001 | Warnick et al. |
| 6,681,396 B1 | 1/2004 | Bates et al. |
| 6,721,490 B1 | 4/2004 | Yao et al. |
| 7,174,512 B2 | 2/2007 | Martin et al. |
| 7,197,715 B1 | 3/2007 | Valeria |
| 7,386,217 B2 | 6/2008 | Zhang |
| 7,543,322 B1 | 6/2009 | Bhogal et al. |
| 7,633,887 B2 | 12/2009 | Panwar et al. |
| 7,646,962 B1 | 1/2010 | Ellis et al. |
| 7,680,894 B2 | 3/2010 | Diot et al. |
| 7,774,811 B2 | 8/2010 | Poslinski et al. |
| 7,818,368 B2 | 10/2010 | Yanq et al. |
| 7,825,989 B1 | 11/2010 | Greenberg |
| 7,849,487 B1 | 12/2010 | Vosseller |
| 7,929,808 B2 | 4/2011 | Seaman et al. |

(Continued)

FOREIGN PATENT DOCUMENTS

| | | |
|---|---|---|
| EP | 1469476 A1 | 10/2004 |
| EP | 1 865 716 A2 | 12/2007 |

(Continued)

OTHER PUBLICATIONS

Boxfish|TV's API; www.boxfish.com, 5 pages.

(Continued)

*Primary Examiner* — Mishawn N Hunter
(74) *Attorney, Agent, or Firm* — Raubvogel Law Office

(57) ABSTRACT

A stream of media content is received in a media device. A value is determined in metadata of the media content relating to an indicia of interest in a portion of the media content. A first clip including the portion of the media content is stored based at least in part on the indicia of interest, whereby the first clip is made available for later retrieval.

16 Claims, 3 Drawing Sheets

(56) References Cited

U.S. PATENT DOCUMENTS

| | | |
|---|---|---|
| 8,024,753 B1 | 9/2011 | Kummer et al. |
| 8,046,798 B1 | 10/2011 | Schlack et al. |
| 8,079,052 B2 | 12/2011 | Chen et al. |
| 8,099,315 B2 * | 1/2012 | Amento .............. G06Q 30/02 705/26.7 |
| 8,104,065 B2 | 1/2012 | Aaby et al. |
| 8,140,570 B2 | 3/2012 | Ingrassia et al. |
| 8,196,168 B1 | 6/2012 | Bryan et al. |
| 8,209,713 B1 | 6/2012 | Lai et al. |
| 8,296,797 B2 | 10/2012 | Olstad et al. |
| 8,296,808 B2 | 10/2012 | Hardacker et al. |
| 8,312,486 B1 | 11/2012 | Briggs et al. |
| 8,320,674 B2 | 11/2012 | Guillou et al. |
| 8,424,041 B2 | 4/2013 | Candelore et al. |
| 8,427,356 B1 | 4/2013 | Satish |
| 8,457,768 B2 | 6/2013 | Hammer et al. |
| 8,535,131 B2 | 9/2013 | Packard et al. |
| 8,595,763 B1 | 11/2013 | Packard et al. |
| 8,627,349 B2 | 1/2014 | Kirby et al. |
| 8,688,434 B1 | 4/2014 | Birnbaum et al. |
| 8,689,258 B2 | 4/2014 | Kemo |
| 8,702,504 B1 | 4/2014 | Hughes et al. |
| 8,713,008 B2 | 4/2014 | Negi |
| 8,752,084 B1 | 6/2014 | Lai et al. |
| 8,793,579 B2 | 7/2014 | Halliday et al. |
| 8,973,038 B2 | 3/2015 | Gratton |
| 8,973,068 B2 | 3/2015 | Kotecha et al. |
| 8,990,418 B1 | 3/2015 | Bragg et al. |
| 9,038,127 B2 | 5/2015 | Hastings et al. |
| 9,060,210 B2 | 6/2015 | Packard et al. |
| 9,066,156 B2 | 6/2015 | Kapa |
| 9,213,986 B1 | 12/2015 | Buchheit et al. |
| 9,253,533 B1 | 2/2016 | Morgan |
| 9,264,779 B2 | 2/2016 | Kirby et al. |
| 9,420,333 B2 | 8/2016 | Martch et al. |
| 9,451,202 B2 | 9/2016 | Beals |
| 9,565,474 B2 | 2/2017 | Petruzzelli et al. |
| 9,648,379 B2 * | 5/2017 | Howcroft ............ H04N 21/2747 |
| 9,715,902 B2 | 7/2017 | Coviello et al. |
| 2001/0013123 A1 | 8/2001 | Freeman et al. |
| 2001/0026609 A1 | 10/2001 | Weinstein et al. |
| 2002/0041752 A1 | 4/2002 | Abiko et al. |
| 2002/0059610 A1 | 5/2002 | Ellis |
| 2002/0067376 A1 | 6/2002 | Martin et al. |
| 2002/0075402 A1 | 6/2002 | Robson et al. |
| 2002/0136528 A1 * | 9/2002 | Dagtas ................ G06F 17/3079 386/227 |
| 2002/0157095 A1 | 10/2002 | Masumitsu et al. |
| 2002/0157101 A1 | 10/2002 | Schrader et al. |
| 2002/0174430 A1 | 11/2002 | Ellis et al. |
| 2002/0178444 A1 | 11/2002 | Trajkovic et al. |
| 2002/0180774 A1 | 12/2002 | Errico et al. |
| 2002/0194095 A1 | 12/2002 | Koren |
| 2003/0012554 A1 | 1/2003 | Zeidler et al. |
| 2003/0023742 A1 | 1/2003 | Allen et al. |
| 2003/0056220 A1 | 3/2003 | Thornton et al. |
| 2003/0066077 A1 | 4/2003 | Gutta et al. |
| 2003/0118014 A1 | 6/2003 | Iyer et al. |
| 2003/0126605 A1 | 7/2003 | Betz et al. |
| 2003/0126606 A1 | 7/2003 | Buczak et al. |
| 2003/0154475 A1 | 8/2003 | Rodriguez et al. |
| 2003/0172376 A1 | 9/2003 | Coffin, III |
| 2003/0188317 A1 | 10/2003 | Liew et al. |
| 2003/0189674 A1 | 10/2003 | Inoue et al. |
| 2003/0208763 A1 | 11/2003 | McElhatten et al. |
| 2003/0229899 A1 | 12/2003 | Thompson |
| 2004/0003403 A1 | 1/2004 | Marsh |
| 2004/0181807 A1 | 9/2004 | Theiste et al. |
| 2005/0005308 A1 | 1/2005 | Logan |
| 2005/0015712 A1 | 1/2005 | Plastina |
| 2005/0030977 A1 | 2/2005 | Casev et al. |
| 2005/0044570 A1 | 2/2005 | Poslinski |
| 2005/0071865 A1 | 3/2005 | Martins |
| 2005/0071881 A1 | 3/2005 | Deshpande |
| 2005/0091690 A1 | 4/2005 | Delpuch et al. |
| 2005/0120368 A1 | 6/2005 | Goronzy et al. |
| 2005/0125302 A1 | 6/2005 | Brown et al. |
| 2005/0149965 A1 | 7/2005 | Neogi |
| 2005/0152565 A1 | 7/2005 | Jouppi et al. |
| 2005/0154987 A1 | 7/2005 | Otsuka et al. |
| 2005/0166230 A1 | 7/2005 | Gaydou et al. |
| 2005/0180568 A1 | 8/2005 | Krause |
| 2005/0182792 A1 | 8/2005 | Israel et al. |
| 2005/0191041 A1 | 9/2005 | Braun et al. |
| 2005/0198570 A1 | 9/2005 | Otsuka et al. |
| 2005/0204294 A1 | 9/2005 | Burke |
| 2005/0240961 A1 | 10/2005 | Jerding |
| 2005/0264705 A1 | 12/2005 | Kitamura |
| 2006/0020962 A1 | 1/2006 | Stark et al. |
| 2006/0085828 A1 | 4/2006 | Dureau et al. |
| 2006/0174277 A1 | 8/2006 | Sezan et al. |
| 2006/0190615 A1 | 8/2006 | Panwar et al. |
| 2006/0218573 A1 * | 9/2006 | Proebstel ............... H04H 60/33 725/14 |
| 2006/0238656 A1 | 10/2006 | Chen et al. |
| 2006/0253581 A1 | 11/2006 | Dixon et al. |
| 2006/0282852 A1 | 12/2006 | Purpura et al. |
| 2006/0282869 A1 | 12/2006 | Plourde, Jr. |
| 2007/0033616 A1 | 2/2007 | Gutta |
| 2007/0058930 A1 | 3/2007 | Iwamoto |
| 2007/0083901 A1 | 4/2007 | Bond |
| 2007/0127894 A1 | 6/2007 | Ando et al. |
| 2007/0146554 A1 | 6/2007 | Strickland et al. |
| 2007/0154163 A1 | 7/2007 | Cordray |
| 2007/0154169 A1 | 7/2007 | Cordrav et al. |
| 2007/0157235 A1 | 7/2007 | Teunissen |
| 2007/0157249 A1 | 7/2007 | Cordrav et al. |
| 2007/0157253 A1 | 7/2007 | Ellis et al. |
| 2007/0157285 A1 | 7/2007 | Frank et al. |
| 2007/0162924 A1 | 7/2007 | Radhakrishnan et al. |
| 2007/0169165 A1 | 7/2007 | Crull et al. |
| 2007/0188655 A1 | 8/2007 | Ohta |
| 2007/0199040 A1 | 8/2007 | Kates |
| 2007/0204302 A1 | 8/2007 | Calzone |
| 2007/0212023 A1 * | 9/2007 | Whillock .......... G06F 17/30787 386/281 |
| 2007/0226766 A1 | 9/2007 | Poslinski et al. |
| 2007/0239856 A1 | 10/2007 | Abadir |
| 2007/0245379 A1 | 10/2007 | Aqnihortri |
| 2007/0288951 A1 | 12/2007 | Ray et al. |
| 2008/0022012 A1 | 1/2008 | Wanq |
| 2008/0060006 A1 | 3/2008 | Shanks et al. |
| 2008/0064490 A1 | 3/2008 | Ellis |
| 2008/0086743 A1 | 4/2008 | Chenq et al. |
| 2008/0092168 A1 | 4/2008 | Logan |
| 2008/0097949 A1 | 4/2008 | Kelly et al. |
| 2008/0109307 A1 | 5/2008 | Ullah |
| 2008/0115166 A1 | 5/2008 | Bhogal et al. |
| 2008/0134043 A1 | 6/2008 | Georgis et al. |
| 2008/0155602 A1 | 6/2008 | Collet |
| 2008/0159708 A1 | 7/2008 | Kazama et al. |
| 2008/0163305 A1 | 7/2008 | Johnson et al. |
| 2008/0168503 A1 | 7/2008 | Sparrell |
| 2008/0178219 A1 | 7/2008 | Grannan |
| 2008/0193016 A1 | 8/2008 | Lim et al. |
| 2008/0195457 A1 | 8/2008 | Sherman et al. |
| 2008/0235348 A1 | 9/2008 | Dasgupta |
| 2008/0239169 A1 | 10/2008 | Moon et al. |
| 2008/0244666 A1 | 10/2008 | Moon et al. |
| 2008/0270038 A1 | 10/2008 | Partovi et al. |
| 2008/0271078 A1 | 10/2008 | Gossweiler et al. |
| 2008/0300982 A1 | 12/2008 | Larson et al. |
| 2008/0307485 A1 | 12/2008 | Clement et al. |
| 2008/0320523 A1 | 12/2008 | Morris et al. |
| 2009/0025027 A1 | 1/2009 | Craner |
| 2009/0034932 A1 | 2/2009 | Oisel et al. |
| 2009/0055385 A1 | 2/2009 | Jean et al. |
| 2009/0080857 A1 | 3/2009 | St. John-Larkin |
| 2009/0082110 A1 | 3/2009 | Relyea et al. |
| 2009/0102984 A1 | 4/2009 | Arlina et al. |
| 2009/0138902 A1 | 5/2009 | Kamen |
| 2009/0144777 A1 | 6/2009 | Mikami et al. |
| 2009/0158357 A1 | 6/2009 | Miller |
| 2009/0178071 A1 | 7/2009 | Whitehead |

(56) References Cited

U.S. PATENT DOCUMENTS

| | | |
|---|---|---|
| 2009/0210898 A1 | 8/2009 | Childress et al. |
| 2009/0228911 A1 | 9/2009 | Vriisen |
| 2009/0234828 A1 | 9/2009 | Tu |
| 2009/0235313 A1 | 9/2009 | Maruyama et al. |
| 2009/0249412 A1 | 10/2009 | Bhogal et al. |
| 2009/0293093 A1 | 11/2009 | Igarashi |
| 2009/0299824 A1 | 12/2009 | Barnes, Jr. |
| 2009/0325523 A1 | 12/2009 | Choi |
| 2010/0040151 A1 | 2/2010 | Garrett |
| 2010/0064306 A1 | 3/2010 | Tionqson et al. |
| 2010/0071007 A1 | 3/2010 | Meijer |
| 2010/0071062 A1 | 3/2010 | Choyi et al. |
| 2010/0086277 A1 | 4/2010 | Craner |
| 2010/0089996 A1 | 4/2010 | Koolar |
| 2010/0115554 A1 | 5/2010 | Drouet et al. |
| 2010/0122294 A1 | 5/2010 | Craner |
| 2010/0123830 A1 | 5/2010 | Vunic |
| 2010/0125864 A1 | 5/2010 | Dwyer et al. |
| 2010/0146560 A1 | 6/2010 | Bonfrer |
| 2010/0153856 A1 | 6/2010 | Russ |
| 2010/0153983 A1 | 6/2010 | Phillmon et al. |
| 2010/0153999 A1 | 6/2010 | Yates |
| 2010/0158479 A1 | 6/2010 | Craner |
| 2010/0166389 A1 | 7/2010 | Knee et al. |
| 2010/0169925 A1 | 7/2010 | Takegoshi |
| 2010/0218214 A1 | 8/2010 | Fan et al. |
| 2010/0251295 A1 | 9/2010 | Amento et al. |
| 2010/0251304 A1 | 9/2010 | Donoghue |
| 2010/0251305 A1 | 9/2010 | Kimble et al. |
| 2010/0262986 A1 | 10/2010 | Adimatvam et al. |
| 2010/0269144 A1 | 10/2010 | Forsman et al. |
| 2010/0319019 A1 | 12/2010 | Zazza |
| 2010/0322592 A1 | 12/2010 | Casagrande |
| 2010/0333131 A1 | 12/2010 | Parker et al. |
| 2011/0016492 A1 | 1/2011 | Marita |
| 2011/0016493 A1 | 1/2011 | Lee et al. |
| 2011/0019839 A1 | 1/2011 | Nandury |
| 2011/0052156 A1 | 3/2011 | Kuhn |
| 2011/0072448 A1 | 3/2011 | Stiers et al. |
| 2011/0082858 A1 | 4/2011 | Yu et al. |
| 2011/0109801 A1 | 5/2011 | Thomas et al. |
| 2011/0161242 A1 | 6/2011 | Chung |
| 2011/0173337 A1 | 7/2011 | Walsh et al. |
| 2011/0202956 A1 | 8/2011 | Connelly et al. |
| 2011/0206342 A1 | 8/2011 | Thompson et al. |
| 2011/0212756 A1 | 9/2011 | Packard et al. |
| 2011/0217024 A1 | 9/2011 | Schlieski |
| 2011/0231887 A1* | 9/2011 | West et al. ............ 725/116 |
| 2011/0239249 A1 | 9/2011 | Murison et al. |
| 2011/0243533 A1 | 10/2011 | Stern et al. |
| 2011/0252451 A1 | 10/2011 | Turgeman et al. |
| 2011/0286721 A1 | 11/2011 | Craner |
| 2011/0289410 A1 | 11/2011 | Paczkowski et al. |
| 2011/0293113 A1 | 12/2011 | McCarthy |
| 2012/0020641 A1 | 1/2012 | Sakaniwa et al. |
| 2012/0047542 A1 | 2/2012 | Lewis |
| 2012/0052941 A1 | 3/2012 | Mo |
| 2012/0060178 A1 | 3/2012 | Minakuchi et al. |
| 2012/0082431 A1 | 4/2012 | Sengupta et al. |
| 2012/0106932 A1 | 5/2012 | Grevers, Jr. |
| 2012/0110615 A1 | 5/2012 | Kilar et al. |
| 2012/0110616 A1 | 5/2012 | Kilar et al. |
| 2012/0124625 A1 | 5/2012 | Foote et al. |
| 2012/0131613 A1 | 5/2012 | Ellis et al. |
| 2012/0185895 A1 | 7/2012 | Wong et al. |
| 2012/0204209 A1 | 8/2012 | Kuba |
| 2012/0216118 A1 | 8/2012 | Lin et al. |
| 2012/0230651 A1 | 9/2012 | Chen |
| 2012/0237182 A1 | 9/2012 | Eyer |
| 2012/0246672 A1 | 9/2012 | Sridhar et al. |
| 2012/0260295 A1 | 10/2012 | Rondeau |
| 2012/0263439 A1 | 10/2012 | Lassman |
| 2012/0278834 A1 | 11/2012 | Richardson |
| 2012/0278837 A1 | 11/2012 | Curtis et al. |
| 2012/0284745 A1 | 11/2012 | Strang |
| 2012/0311633 A1 | 12/2012 | Mandrekar et al. |
| 2012/0324491 A1 | 12/2012 | Bathiche et al. |
| 2013/0014159 A1 | 1/2013 | Wiser et al. |
| 2013/0042179 A1 | 2/2013 | Cormack |
| 2013/0055304 A1 | 2/2013 | Kirby et al. |
| 2013/0061313 A1 | 3/2013 | Cullimore et al. |
| 2013/0073473 A1* | 3/2013 | Heath ............... G06Q 30/02 705/319 |
| 2013/0074109 A1 | 3/2013 | Skelton et al. |
| 2013/0114940 A1 | 5/2013 | Merzon et al. |
| 2013/0128119 A1 | 5/2013 | Madathodivil et al. |
| 2013/0138435 A1 | 5/2013 | Weber |
| 2013/0145023 A1 | 6/2013 | Li et al. |
| 2013/0160051 A1 | 6/2013 | Armstrong et al. |
| 2013/0174196 A1 | 7/2013 | Herlein |
| 2013/0194503 A1 | 8/2013 | Yamashita |
| 2013/0226983 A1 | 8/2013 | Beining et al. |
| 2013/0251331 A1 | 9/2013 | Sambongi |
| 2013/0263189 A1 | 10/2013 | Garner |
| 2013/0268620 A1* | 10/2013 | Osminer ............ H04N 21/251 709/217 |
| 2013/0268955 A1 | 10/2013 | Conrad et al. |
| 2013/0283162 A1 | 10/2013 | Aronsson et al. |
| 2013/0291037 A1 | 10/2013 | Im et al. |
| 2013/0298146 A1 | 11/2013 | Conrad et al. |
| 2013/0298151 A1 | 11/2013 | Leske et al. |
| 2013/0325869 A1 | 12/2013 | Reiley et al. |
| 2013/0326406 A1 | 12/2013 | Reiley et al. |
| 2013/0326575 A1 | 12/2013 | Robillard et al. |
| 2013/0332962 A1 | 12/2013 | Moritz et al. |
| 2013/0332965 A1 | 12/2013 | Seyller et al. |
| 2013/0346302 A1 | 12/2013 | Purves et al. |
| 2014/0023348 A1 | 1/2014 | O'Kelly |
| 2014/0028917 A1 | 1/2014 | Smith et al. |
| 2014/0032709 A1 | 1/2014 | Saussy et al. |
| 2014/0062696 A1 | 3/2014 | Packard et al. |
| 2014/0067825 A1 | 3/2014 | Oztaskent et al. |
| 2014/0067828 A1* | 3/2014 | Archibong ........ H04L 65/4084 707/748 |
| 2014/0067939 A1 | 3/2014 | Packard et al. |
| 2014/0068675 A1 | 3/2014 | Mountain |
| 2014/0068692 A1 | 3/2014 | Archibong et al. |
| 2014/0074866 A1* | 3/2014 | Shah ............. G06F 17/30817 707/749 |
| 2014/0082670 A1 | 3/2014 | Papish |
| 2014/0114647 A1 | 4/2014 | Allen |
| 2014/0114966 A1 | 4/2014 | Bilinski et al. |
| 2014/0123160 A1 | 5/2014 | van Coppenolle et al. |
| 2014/0139555 A1 | 5/2014 | Levy |
| 2014/0140680 A1 | 5/2014 | Jo |
| 2014/0150009 A1 | 5/2014 | Sharma |
| 2014/0153904 A1 | 6/2014 | Adimatvam et al. |
| 2014/0157327 A1 | 6/2014 | Roberts et al. |
| 2014/0161417 A1 | 6/2014 | Kurupacheril et al. |
| 2014/0215539 A1 | 7/2014 | Chen et al. |
| 2014/0223479 A1 | 8/2014 | Krishnamoorthi |
| 2014/0282714 A1 | 9/2014 | Hussain |
| 2014/0282741 A1 | 9/2014 | Shoykhet |
| 2014/0282744 A1 | 9/2014 | Hardy et al. |
| 2014/0282745 A1 | 9/2014 | Chipman et al. |
| 2014/0282759 A1 | 9/2014 | Harvey et al. |
| 2014/0282779 A1 | 9/2014 | Navarra |
| 2014/0294201 A1 | 10/2014 | Johnson et al. |
| 2014/0298378 A1 | 10/2014 | Kelley |
| 2014/0310819 A1 | 10/2014 | Cakarel et al. |
| 2014/0313341 A1 | 10/2014 | Stribling |
| 2014/0321831 A1 | 10/2014 | Olsen et al. |
| 2014/0325556 A1 | 10/2014 | Hoang et al. |
| 2014/0331260 A1 | 11/2014 | Gratton |
| 2014/0333841 A1 | 11/2014 | Steck |
| 2014/0351045 A1 | 11/2014 | Abihssira et al. |
| 2014/0373079 A1 | 12/2014 | Friedrich et al. |
| 2015/0003814 A1 | 1/2015 | Miller |
| 2015/0012656 A1 | 1/2015 | Phillips et al. |
| 2015/0020097 A1 | 1/2015 | Freed et al. |
| 2015/0040176 A1 | 2/2015 | Hybertson et al. |
| 2015/0052568 A1 | 2/2015 | Glennon et al. |
| 2015/0058890 A1 | 2/2015 | Kapa |
| 2015/0082172 A1 | 3/2015 | Shakib et al. |

(56) References Cited

U.S. PATENT DOCUMENTS

| | | |
|---|---|---|
| 2015/0095932 A1 | 4/2015 | Ren |
| 2015/0118992 A1 | 4/2015 | Wyatt et al. |
| 2015/0181132 A1 | 6/2015 | Kummer et al. |
| 2015/0181279 A1 | 6/2015 | Martch et al. |
| 2015/0189377 A1 | 7/2015 | Wheatley et al. |
| 2015/0249803 A1 | 9/2015 | Tozer et al. |
| 2015/0249864 A1 | 9/2015 | Tang et al. |
| 2015/0281778 A1 | 10/2015 | Xhafa et al. |
| 2015/0310725 A1 | 10/2015 | Koskan et al. |
| 2015/0334461 A1 | 11/2015 | Yu |
| 2016/0066020 A1 | 3/2016 | Mountain |
| 2016/0066026 A1 | 3/2016 | Mountain |
| 2016/0066049 A1 | 3/2016 | Mountain |
| 2016/0066056 A1 | 3/2016 | Mountain |
| 2016/0073172 A1 | 3/2016 | Sharples |
| 2016/0088351 A1 | 3/2016 | Petruzzelli et al. |
| 2016/0191147 A1 | 6/2016 | Martch |
| 2016/0198229 A1 | 7/2016 | Keipert |
| 2016/0309212 A1 | 10/2016 | Martch et al. |

FOREIGN PATENT DOCUMENTS

| | | |
|---|---|---|
| EP | 2107477 A2 | 10/2009 |
| EP | 2 309 733 B1 | 4/2011 |
| EP | 2 403 239 A1 | 1/2012 |
| EP | 2464138 A1 | 6/2012 |
| FR | 2 902 568 A1 | 12/2007 |
| JP | H10 322622 A | 12/1998 |
| JP | 2005-317165 | 11/2005 |
| JP | 2006-245745 A | 9/2006 |
| JP | 2012-029150 | 2/2012 |
| JP | 2013-175854 | 9/2013 |
| JP | 2014-157460 | 8/2014 |
| KR | 2004 0025073 A | 3/2004 |
| KR | 2006 0128295 A | 12/2006 |
| WO | 98/37694 A1 | 8/1988 |
| WO | 0243353 A2 | 5/2002 |
| WO | 2005/059807 A2 | 6/2005 |
| WO | 2007/064987 A2 | 6/2007 |
| WO | 2007/098067 A1 | 8/2007 |
| WO | 2009/073925 | 6/2009 |
| WO | 2011/040999 A1 | 4/2011 |
| WO | 2013/016626 A1 | 1/2013 |
| WO | 2013166456 | 11/2013 |
| WO | 2014/072742 A1 | 5/2014 |
| WO | 2014/164782 A1 | 10/2014 |
| WO | 2014/179017 A1 | 11/2014 |
| WO | 2016/030384 | 3/2016 |
| WO | 2016/030477 A1 | 3/2016 |
| WO | 2016/034899 A1 | 3/2016 |
| WO | 2016/055761 A1 | 4/2016 |

OTHER PUBLICATIONS

Thuuz Sports, "Frequently Asked Questions", www.thuuz.com/faq/, 5 pages.
International Search Report for PCT/US2014/060651 dated Jan. 19, 2015 (9 pages).
International Search Report for PCT/US2014/060649 dated Jan. 8, 2015 (9 pages).
International Preliminary Report on Patentability for PCT/US2014/060651 dated May 6, 2016 (7 pages).
International Preliminary Report on Patentability for PCT/US2014/060649 dated May 6, 2016 (6 pages).
International Search Report and Written Opinion for PCT/GB2015/052456 dated Jun. 13, 2016, all pages.
U.S. Appl. No. 13/834,916, filed Mar. 15, 2013, Non-Final Rejection dated Aug. 18, 2016, all pages.
U.S. Appl. No. 14/470,248, filed Aug. 27, 2014, Non Final Office Action dated Jul. 25, 2016, all pages.
U.S. Appl. No. 14/470,279, filed Aug. 27, 2014, Non Final Office Action dated Jul. 19, 2016, all pages.
U.S. Appl. No. 14/479,007, filed Sep. 5, 2014, Non-Final Office Action dated Jul. 27, 2016, 37 pages.
U.S. Appl. No. 13/942,451, filed Jul. 15, 2013, Final Office Action dated Jun. 22, 2016, all pages.
U.S. Appl. No. 14/139,299, filed Dec. 23, 2013, Non Final Office Action dated Jun. 20, 2016, all pages.
U.S. Appl. No. 14/470,392, filed Aug. 27, 2014, Non-Final Office Action dated Aug. 5, 2016, all pages.
U.S. Appl. No. 14/470,415, filed Aug. 27, 2014, Non Final Office Action dated Jul. 29, 2016, all pages.
U.S. Appl. No. 14/297,279, filed Jun. 5, 2014, Final Rejection dated Apr. 22, 2016, 33 pages.
U.S. Appl. No. 14/139,420, filed Dec. 23, 2013, Notice of Allowance dated Mar. 31, 2016, 37 pages.
U.S. Appl. No. 13/801,932, filed Mar. 13, 2013, Non-Final Rejection dated May 20, 2016, 28 pages.
International Preliminary Report on Patentability for PCT/US2014/023466 dated Sep. 15, 2015, 8 pages.
International Search Report and Written Opinion for PCT/EP2015/069461 dated Oct. 1, 2015, 13 pages.
International Search Report and Written Opinion for PCT/EP2015/069456 dated Oct. 5, 2015, all pages.
International Preliminary Report on Patentability for PCT/US2014/033796 dated Nov. 3, 2015, all pages.
International Search Report and Written Opinion for PCT/EP2015/069681 dated Nov. 23, 2015, 12 pages.
U.S. Appl. No. 14/297,322, filed Jun. 5, 2014, Notice of Allowance dated Nov. 5, 2015, 34 pages.
U.S. Patent Application No. 14/297,279, filed Jun. 5, 2014, Non-Final Office Action dated Nov. 5, 2015, 45 pages.
U.S. Appl. No. 14/200,864, filed Mar. 7, 2014, Non-Final Office Action dated Feb. 18, 2016, 61 pages.
U.S. Appl. No. 14/479,007, filed Sep. 5, 2014, Final Office Action dated Feb. 22, 2016, 37 pages.
U.S. Appl. No. 14/095,860, filed Dec. 3, 2013, Notice of Allowance dated Oct. 19, 2015, 14 pages.
U.S. Appl. No. 14/071,613, filed Nov. 4, 2013, Final Office Action dated Oct. 8, 2015, 11 pages.
U.S. Appl. No. 14/139,299, filed Dec. 23, 2013, Final Office Action dated Feb. 25, 2016, all pages.
U.S. Appl. No. 14/470,392, filed Aug. 27, 2014, Non Final Office Action dated Nov. 5, 2015, 31 pages.
U.S. Appl. No. 14/470,392, filed Aug. 27, 2014, Final Office Action dated Mar. 4, 2016, all pages.
U.S. Appl. No. 14/470,415, filed Aug. 27, 2014, Non Final Office Action dated Nov. 18, 2015, 28 pages.
U.S. Appl. No. 14/470,415, filed Aug. 27, 2014, Final Office Action dated Mar. 3, 2016, all pages.
U.S. Appl. No. 13/801,932, filed Mar. 13, 2013, Final Office Action dated Dec. 17, 2015, 23 pages.
U.S. Appl. No. 13/834,916, filed Mar. 15, 2013, Final Office Action dated Dec. 14, 2015, 31 pages.
U.S. Appl. No. 14/470,248, filed Aug. 27, 2014, Final Office Action dated Feb. 16, 2016, 26 pages.
U.S. Appl. No. 14/470,279, filed Aug. 27, 2014, Final Office Action dated Jan. 22, 2016, 25 pages.
U.S. Appl. No. 14/591,474, filed Jan. 7, 2015, Non-Final Office Action dated Feb. 12, 2016, 32 pages.
U.S. Appl. No. 14/494,079, filed Sep. 23, 2014, Preinterview first office action dated Feb. 10, 2016, 6 pages.
Office Action for EP 14160140.1, dated Jan. 19, 2016, 5 pages.
International Search Report and Written Opinion for PCT/GB2015/052570, dated Dec. 11, 2015, 13 pages.
U.S. Appl. No. 14/470,248, filed Aug. 27, 201, Preinterview first office action dated Sep. 4, 2015, 22 pages.
U.S. Appl. No. 14/470,279, filed Aug. 27, 2014, Preinterview first office action dated Aug. 26, 2015, 23 pages.
U.S. Appl. No. 14/479,007, filed Sep. 5, 2014, Non-Final Office Action dated Sep. 1, 2015, 44 pages.
U.S. Appl. No. 14/139,299, filed Dec. 23, 2013, Non Final Office Action dated Aug. 14, 2015, 39 pages.
Jin S H et al., "Intelligent broadcasting system and services for personalized semantic contents consumption", Expert Systems With

(56) References Cited

OTHER PUBLICATIONS

Applications, Oxford, GB, vol. 31, No. 1, Jul. 1, 2006, pp. 164-173, XP024962718, ISSN: 0957-4174, DOI: 10.1016/J.ESWA.2005.09. 021.
Sung Ho Jin et al., "Real-time content filtering for live broadcasts in TV terminals", Multimedia Tools and Applications, Kluwer Academic Publishers, BO, vol. 36, No. 3, Jun. 29, 2007 pp. 285-301, XP019578768, ISSN: 1573-7721.
European Search Report for EP 14197940.1 dated Apr. 28, 2015, 13 pages.
U.S. Appl. No. 13/971,579, filed Aug. 20, 2013, Notice of Allowance dated Feb. 27, 2015, 28 pages.
U.S. Appl. No. 13/801,932, filed Mar. 13, 2013, Non Final Office Action dated Jun. 24, 2015, 21 pages.
U.S. Appl. No. 13/834,916, filed Mar. 15, 2013, Non Final Office Action dated Apr. 27, 2015, 22 pages.
U.S. Appl. No. 13/942,451, filed Jul. 15, 2013, Final Office Action dated Apr. 30, 2015, 33 pages.
U.S. Appl. No. 14/071,613, filed Nov. 4, 2013, Non-Final Office Action dated May 18, 2015, 20 pages.
U.S. Appl. No. 14/095,860, filed Dec. 3, 2013, Final Office Action dated May 1, 2015, 18 pages.
U.S. Appl. No. 14/095,860, filed Dec. 3, 2013, Notice of Allowance dated Jul. 13, 2015, 31 pages.
U.S. Appl. No. 14/139,420, filed Dec. 23, 2013, Non-Final Office Action dated Apr. 30, 2015, 27 pages.
U.S. Appl. No. 14/200,864, filed Mar. 7, 2014, Final Office Action dated Jun. 18, 2015, 36 pages.
U.S. Appl. No. 13/834,916, filed Mar. 15, 2013, Final Office Action dated Jan. 12, 2015, 22 pages.
U.S. Appl. No. 13/886,873, filed May 3, 2013, Notice of Allowance dated Oct. 24, 2014, 40 pages.
U.S. Appl. No. 14/095,860, filed Dec. 3, 2013, Non-Final Office Action dated Dec. 26, 2014, 45 pages.
U.S. Appl. No. 14/200,864, filed Mar. 7, 2014, Non-Final Office Action dated Dec. 5, 2014, 35 pages.
International Search Report and Written Opinion of PCT/US2014/ 033796 dated Sep. 5, 2014, 12 pages.
U.S. Appl. No. 13/971,579, filed Aug. 20, 2013, Non Final Office Action dated Oct. 28, 2014, 35 pages.
Extended European Search Report for EP 14160140.1 dated Jul. 7, 2014, 7 pages.
International Search Report and Written Opinion for PCT/US2014/ 023466 dated Jul. 10, 2014, 15 pages.
U.S. Appl. No. 13/801,932, filed Mar. 13, 2013, Notice of Allowance dated Nov. 25, 2016, all pages.
U.S. Appl. No. 13/834,916, filed Mar. 15, 2013, Non Final Office Action dated Aug. 8, 2014, 19 pages.
U.S. Appl. No. 13/942,451, filed Jul. 15, 2013, Non Final Office Action dated Jul. 28, 2014, 27 pages.
Extended European Search Report for EP 11166892.7 dated Oct. 6, 2011, 7 pages.
U.S. Appl. No. 14/200,864, filed Mar. 7, 2014, Notice of Allowance dated Sep. 15, 2016, all pages.
U.S. Appl. No. 14/470,248, filed Aug. 27, 2014, Final Office Action dated Dec. 9, 2016, all pages.
U.S. Appl. No. 14/470,279, filed Aug. 27, 2014, Final Office Action dated Dec. 9, 2016, all pages.
U.S. Appl. No. 14/479,007, filed Sep. 5, 2014, Final Office Action dated Jan. 23, 2017, all pages.
U.S. Appl. No. 14/591,474, filed Jan. 7, 2015, Non-Final Office Action dated Dec. 16, 2016, 32 pages.
U.S. Appl. No. 15/195,527, filed Jun. 28, 2016, Non-Final Rejection dated Sep. 30, 2016, all pages.
U.S. Appl. No. 13/942,451, filed Jul. 15, 2013, Non Final Office Action dated Oct. 25, 2016, all pages.
R. Natarajan et al. "Audio-Based Event Detection in Videos—A Comprehensive Survey", Int. Journal of Engineering and Technology, vol. 6 No. 4 Aug.-Sep. 2014.
Q. Huang et al. "Hierarchical Language Modeling for Audio Events Detection in a Sports Game", IEEE International Conference on Acoustics, Speech and Signal Processing, 2010.
Q. Huang et al. "Inferring the Structure of a Tennis Game Using Audio Information", IEEE Trans. on Audio Speech and Language Proc., Oct. 2011.
M. Baillie et al. "Audio-based Event Detection for Sports Video", International Conference on Image and Video, CIVR 2003.
Y. Rui et al. "Automatically Extracting Highlights for TV Baseball Programs", Proceedings of the eighth ACM International conference on Multimedia, 2000.
D. A. Sadlier et al. "A Combined Audio-Visual Contribution to Event Detection in Field Sports Broadcast Video. Case Study: Gaelic Football", Proceedings of the 3rd IEEE International Symposium on Signal Processing and Information Technology, Dec. 2003.
E. Kijak et al. "Audiovisual Integration for Tennis Broadcast Structuring", Multimedia Tools and Applications, Springer, vol. 30, Issue 3, pp. 289-311, Sep. 2006.
A. Baijal et al. "Sports Highlights Generation Based on Acoustic Events Detection: A Rugby Case Study", IEEE International Conference on Consumer Electronics (ICCE), 2015.
J. Han et al. "A Unified and Efficient Framework for Court-Net Sports Video Analysis Using 3-D Camera Modeling", Proceedings vol. 6506, Multimedia Content Access: Algorithms and Systems; 65060F (2007).
Huang-Chia Shih "A Survey on Content-aware Video Analysis for Sports", IEEE Trans. on Circuits and Systems for Video Technology, vol. 99, No. 9, Jan. 2017.
A. Krizhevsky et al. "ImageNet Classification with Deep Convolutional Neural Networks", In Proc. NIPS, pp. 1097-1105, 2012.
D. A. Sadlier et al. "Event Detection in Field Sports Video Using Audio-Visual Features and a Support Vector Machine", IEEE Trans. on Circuits and Systems for Video Technology, vol. 15, No. 10, Oct. 2005.
P. F. Felzenszwalb et al. "Efficient Graph-Based Image Segmentation", International Journal of Computer Vision, Sep. 2004, vol. 59, Issue 2, pp. 167-181.
C. J. C. Burges "A Tutorial on Support Vector Machines for Pattern Recognition", Springer, Data Mining and Knowledge Discovery, Jun. 1998, vol. 2, Issue 2, pp. 121-167.
Y.A. LeCun et al. "Efficient BackProp" Neural Networks: Tricks of the Trade. Lecture Notes in Computer Science, vol. 7700, Springer, 2012.
L. Neumann, J. Matas, "Real-Time Scene Text Localization and Recognition", 5th IEEE Conference on Computer Vision and Pattern Recognition, Jun. 2012.
R. Smith "An Overview of the Tesseract OCR Engine", International Conference on Document Analysis and Recognition (ICDAR), 2007.

\* cited by examiner

DYNAMIC MEDIA RECORDING

BACKGROUND

Digital video recorders (DVR's) and the like may be used to record presentations of media content, such as sporting events, political events, etc. However, even when the subject of an item of media content is of interest to a user, e.g., a football fan may generally be interested in a football game, some or all portions of the item of media content may not be of interest to the user. For example, a user may not be interested in seeing an entire football game between teams the user does not follow, or may not have time to watch an entire game. Unfortunately, mechanisms are lacking to allow a user to record and view only portions of items of media content of interest to the user, e.g., exciting portions of a football game or other sporting event.

DRAWINGS

DETAILED DESCRIPTION

Introduction

Figure 1:
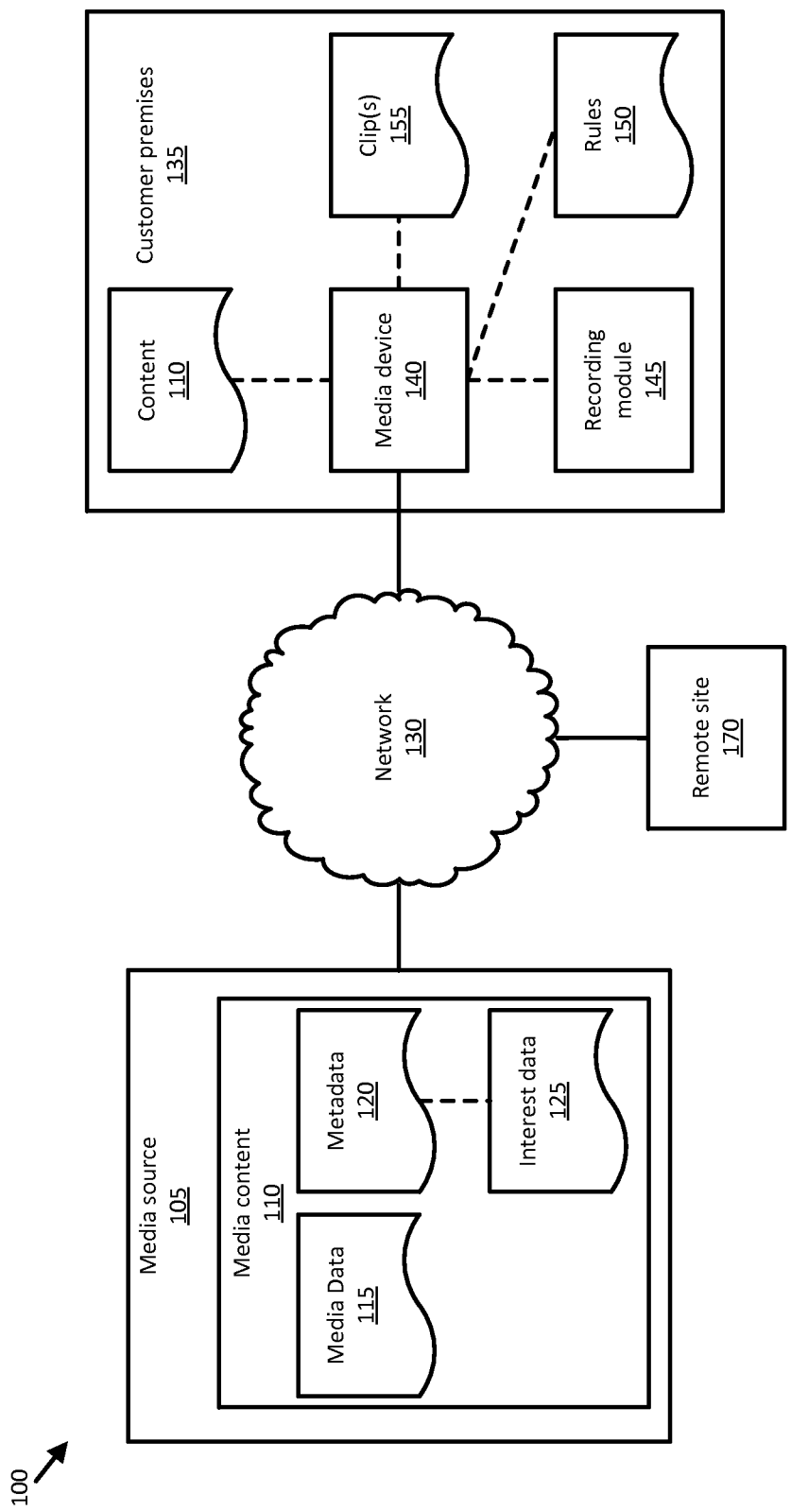
FIG. 1 is a block diagram of an exemplary media content delivery system.

FIG. 1 is a block diagram of an exemplary media content delivery system 100. Using certain elements of the system 100 as disclosed herein, in an exemplary implementation, a digital media processing device 140 may selectively, e.g., dynamically, record portions of a video stream determined likely to be of interest, e.g., exciting, to a viewer. Accordingly, the media processing device 140 may be used to generate and store clips 155. Further, the clips 155 may be presented to a user in a variety of ways, e.g., presented for selective retrieval by a user, one or more clips 155 may be arranged together to create a custom program for a user, etc.

Accordingly, with reference to certain of the exemplary elements shown in FIG. 1, a media source 105 in the system 100 includes media content 110, e.g., streaming content such as a video presentation which in the context of the system 100 may be an event such as a sporting event or other public event, or a presentation, e.g., a news presentation, etc. The media content 110 may be provided via a network 130 to a media device 140 that is generally located in a customer premises 135. Media content 110 may include media data 115, e.g., frames of video and associated audio, along with metadata 120 describing various attributes and or portions of the media data 115. The media source 105 may also store, e.g., included in the metadata 120, interest data 125 related to an item of media content 110. The interest data 125 generally includes indicia of likely user interest, e.g., a tag or keyword or the like, or a numerical value indicating or rating a likely level of user interest in a portion of the media data 115, e.g., relating to an excitement level or the like for the portion of media data 115. A recording module 145 included in the media device 140 may use the metadata 120, including the interest data 125, and possibly also a set of rules 150, to generate one or more clips 155 of the content 110.

Exemplary System Elements

Media Source

In general, media source 105 may include multiple elements for processing, storing, and providing media content 110 and related data. Elements of the media source 105 may be local to one another and/or may be distributed amongst multiple locations. For example, media source 105 may include one or more computer servers (some or all of which may be referred to as "media servers") and data storage devices, e.g., for storing and processing content 110 and other data such as discussed herein.

In general, the media source 105 may be any one or some combination of various mechanisms for delivering media content 110, e.g., one or more computing devices and storage devices, and may depend on a type of media content 110 being provided. By way of example and not limitation, media content 110 data may be provided as video-on-demand through a cable, satellite, or internet protocol television (IPTV) distribution system, as streaming Internet video data, or as some other kind of data. Accordingly, the media source 105 may include one or more of a cable or satellite television headend, a video streaming service that generally includes a multimedia web server (or some other computing device), or some other mechanism for delivering multimedia data. In general, examples of media content 110 include various types of data, including audio, video, images, etc.

Media content 110 is generally delivered via the network 130 in a digital format, e.g., as compressed audio and/or video data. The media content 110 generally includes, according to such digital format, media data 115 and media metadata 120. For example, MPEG refers to a set of standards generally promulgated by the International Standards Organization/International Electrical Commission Moving Picture Experts Group (MPEG). H.264 refers to a standard promulgated by the International Telecommunications Union (ITU). Accordingly, by way of example and not limitation, media content 110 may be provided in a format such as the MPEG-1, MPEG-2 or the H.264/MPEG-4 Advanced Video Coding standards (AVC) (H.264 and MPEG-4 at present being consistent), or according to some other standard or standards. For example, media content 110 could be audio data formatted according to standards such as MPEG-2 Audio Layer III (MP3), Advanced Audio Coding (AAC), etc. Further, the foregoing standards generally provide for including metadata, e.g. media metadata 120, along with media data 115, in a file of media content 110, such as the media metadata 120 discussed herein (and moreover, as discussed elsewhere herein, the metadata 120 may include other elements such as interest data 125).

Media content 110 includes media content as it is usually provided for general distribution, e.g., a sports or news program, etc., in a form has provided by a distributor of the media content 110 via a media source 105. Alternatively or additionally, media content 110 may be modified from the form provided by a general distributor of content (e.g., recompressed, re-encoded, etc.). In any case, media data 115 generally includes data by which a display, playback, representation, etc. of the media content 110 is presented by a media device 140, e.g., on a display device such a monitor, television set, etc. For example, media data 115 generally includes units of encoded and/or compressed video data, e.g., frames of an MPEG file or stream.

Media metadata 120 may include metadata as provided by an encoding standard such as an MPEG standard. Alternatively and/or additionally, media metadata 120 could be stored and/or provided separately to a media device 140, apart from media data 115. In general, media metadata 120 provides general descriptive information for an item of media content 110. Examples of media metadata 120 include information such as content 110 title, chapter, actor information, Motion Picture Association of America MPAA rating information, reviews, and other information that describes an item of media content 110. Information for metadata 120 may be gathered from a content producer, e.g., a movie studio, media information aggregators, and other sources such as critical movie reviews.

As already mentioned, the metadata 120 may include other elements such as interest data 125. Accordingly, generally as part of metadata 120 in media content 110, interest data 125 may be provided from the media source 105 to one or more media devices 140. The interest data 125 generally includes one or more indicia of interest, e.g., a numerical excitement or interest rating, a descriptive keyword or tag, etc., relating to a portion or portions of media data 115. Interest data 125 may be provided according to a variety of mechanisms, e.g., a third party vendor may supply interest data 125 concerning an item of media content 110 in real time or near real time as the media content 110, e.g., a live sporting event, is made available from the media source 105.

Figure 2:
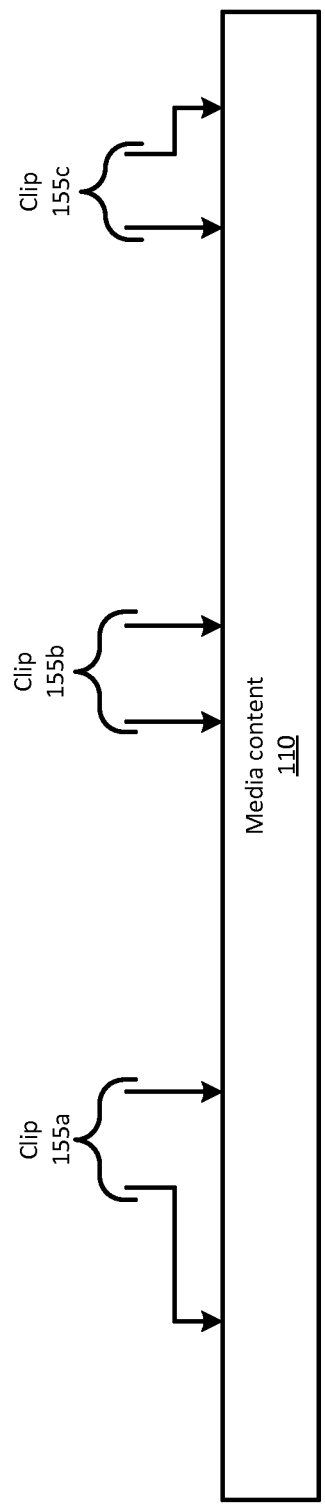
FIG. 2 is a block diagram of exemplary media content.

In addition, to specify exciting and/or interesting portions of media data 115, interest data 125 generally further includes a pointer or pointers or the like to a location or locations in media data 115, e.g., according to timestamps or other indices. Such pointers may be used to access one or more portions of media data 115, e.g., such as may be specified according to pointers or the like provided in the metadata 120 associated with the media data 115. For example, FIG. 2 is a block diagram of an exemplary item of media content 110 with interest data 125 specifying various segments in the media content 110. As stated above, media data 115 is typically an encoded (e.g., MPEG) video stream or file. Metadata 120 includes indices or the like according to which interest data 125 may point to a specified segment (or segments), e.g., a specified set of frames of the media data 115 included in the content 110. Accordingly, clips 155a, 155b, 155c, etc., in a file or stream of media content 110 may be specified according to respective indicia of interest, and pointers to respective portions of media data 115, included in respective items of interest data 125.

Network

Communications to and from the media source 105, customer premises 135, and one or more remote sites 170 may occur via the network 130. In general, the network 130 represents one or more mechanisms for delivering content 110 from the media source 105 to a media device 140. Accordingly, the network 130 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks, local area networks (LAN) and/or wide area networks (WAN), including the Internet, etc.

Customer Premises

Turning to the customer premises 135, the media device 140 is generally a device including a computer processor and associated storage, e.g., volatile memory, nonvolatile memory, etc., and capable of communicating via the network 130. Exemplary media devices 140 include a set-top box that includes or is coupled to a digital video recorder (DVR), a personal computer such as a laptop, handheld, or tablet computer, a smart phone, etc. Accordingly, it is to be understood that a media device 140 may be a mobile device rather than being located in a physical customer premises all (or even some) of the time.

The media device 140 may include a display and/or may be connected to a display device, e.g., a television, or may incorporate a display device, e.g., a display of a smartphone, tablet or personal computer. When content 110 is referred to herein as being "displayed," it is to be understood that such display could include any possible mode of displaying media data, such as a display of visual data, audio data, etc. For example, content 110 could be displayed by showing video or image data on a screen with or without sound, by playing audio data with or without a visual display, etc.

The media device 140 generally includes a recording module 145, e.g., a set of instructions stored on a memory of the device 140, and executable by a processor thereof. The recording module 145 is generally configured to identify a portion or portions of media data 115 in media content 110 that meets at least one pre-determined criterion of user interest. The recording module 145 is further generally configured to make this identification according to the indicia of interest included in interest data 125, as well as possibly according to one or more rules 150.

For example, the recording module 145 could be configured to identify interest data 125 included in metadata 120 for a stream of content data 110, and to determine whether the interest data 125 specifies an indicia of interest that should trigger recording of a portion of media data 115. Continuing this example, metadata 120 for each frame included in an MPEG stream of media data 115 could include an interest datum 125 providing an indicia of interest such as a numerical excitement rating, e.g., on a scale from 1 to 100. Then, when the recording module 145 encountered a frame of data 115 associated with an indicia of interest at or above a predetermined threshold, e.g., 75, the recording module 145 could record, i.e., capture for storage, that frame of data 115. Further, any immediately adjacent or contiguous frames of data 115 that met or surpassed the threshold could likewise be captured and included in a clip 155 with the first-identified frame of data 115 that met or surpassed the threshold. Similarly, an interest datum 125 could specify start and end points, e.g., using timestamps, indices, etc., for respective starting and ending locations in a stream of media data 115 between which an indicia of interest had a specified numeric value or associated keyword, a value over a certain threshold, etc.

Likewise, an interest datum 125 could specify a tag or keyword associated with one or more frames of media data 115, and the recording module 145 could capture for storage, i.e. record, frames of media data 115 in a clip 155, where the captured frames of media data 115 were specified by the tags, keyword, etc.

Rules 150 may provide further parameters, rules, etc. for capturing a clip 155. Rules 150 may be predefined for all users, i.e., for all media devices 140, and moreover could be stored by a media source 105 and provided and/or updated in a memory of the media device 140 by the media source 105. Alternatively or additionally, rules 150 may be customized for particular users and/or media devices 140. For example, a generic rule 150, i.e., a rule 150 for all media devices 140, could specify that for events identified in metadata 120 as sporting events, and excitement rating above a value of 75 should trigger recording of a clip 155, but for all other events, e.g., news events, an excitement rating above a value of 85 is required. Further, a custom rule 150 could specify that for events identified in metadata 120 as sporting events for a user's favorite team, e.g., an excitement rating above a value of 60 is required, but for other sporting events in a specified sport, e.g., baseball, an excitement rating above a value of 90 is required. Additionally or alternatively, as discussed in more detail below, a rule 150 could be used to identify an item of media content 110 for which the recording module 145 should examine interest data 125.

As mentioned above, rules 150 could be defined by a media source 105, and moreover, rules 150 could be included in instructions comprised in the recording module 145. Additionally or alternatively, rules 150 could be specified by a user of a media device 140, e.g., using a graphical user interface (GUI) or the like provided on a display associated with the media device 140. For example, such GUI could allow a user to specify keywords, tags, etc. and/or threshold values for interest ratings, e.g., excitement ratings, to trigger recording of a clip 155. Accordingly, a rule 150 could specify both a keyword and a threshold for a numerical interest rating, wherein a combination of the presence of the keyword and meeting or exceeding the threshold triggers recording of a clip 155 according to instructions in the recording module 145.

Remote Sites

A remote site 170, as discussed above, may include a social media site, an e-commerce site, a news site, a site providing reference information, etc. A media device 140 could include instructions for allowing a user to specify a remote site 170 for posting a clip 155. For example, a GUI provided by the media device 140 could allow a user to specify one or more clips 155 to be posted to a user's social media account, or could allow a user to specify that a clip 155 will be automatically posted to a user's social media account when the interest indicia in interest data 125 associated with the clip 155 matches certain keywords, tags, etc. and/or meets or exceeds a specified numeric threshold. Further, a user's account on a remote site 170 could be used to provide tags or the like indicating user interest in subjects that could then be matched to one or more interest data 125.

Exemplary Process Flows

Figure 3:
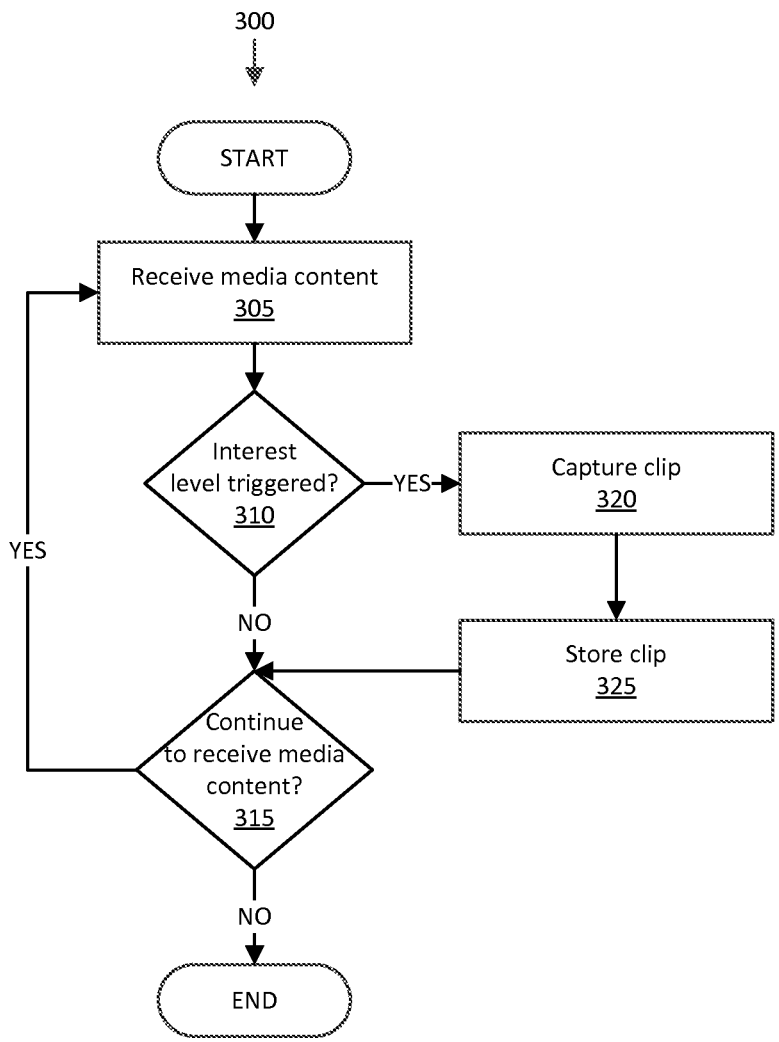
FIG. 3 is a diagram of an exemplary process for recording media content.

FIG. 3 is a diagram of an exemplary process 300 for recording media content.

The process 300 begins in a block 305, in which the media device 140 receives, and analyzes interest data 125 in, media content 110. The media content 110 may be a stream of a live event, such as a sporting event or a news event. However, it is possible that the media content 110 is a prerecorded program or the like. In one implementation, the media device 140 includes a digital video recorder (DVR), and uses operations of the DVR to receive and store media content 110. For example, the media device 140 may include instructions to receive certain programming providing certain items of media content 110, e.g., specified sporting events on specified video channels, and to analyze such items of media content 110 for possible generation of a clip or clips 155 as described herein.

In any case, a specific item of media content 110 analyzed in the block 305 may be selected or identified according to a variety of mechanisms. For example, a GUI provided by the media device 140 or some mechanism of the media source 105, e.g., a webpage or the like, could allow a user to make a selection of one or more items of media content 110 for which interest data 125 should be analyzed for possible recording of one or more clips 155. In this example, a user could be presented with a list of possible programs to select.

Alternatively or additionally, a user profile or the like could be stored in the media device 140, and/or at the media source 105 and provided to the media device 140, where the user profile included information to identify items of media content 110 for review by the media device 140 for possible generation of one or more clips 155. Accordingly, such user profile information could be used in a rule 150 indicating items of media content 110 for which the recording module 145 should examine interest data 125. For example, a user profile, which could be generated according to user-provided input, according to information gathered by user viewing habits, etc., could identify types of programming, and attributes of types of programming, of interest to a user. These program types and/or attributes could be specified in a rule 150. For example, the media device 140 could store and/or could receive from the media source 105 data, e.g., one or more rules 150, indicating that a user of the media device 140 was very interested in the game of football and/or an identity of a particular football team.

In any event, the media device 140 could be configured to analyzed interest data 125 for items of media content 110 received from the media source 105 according to broadcasts received over particular viewing channels available from the media source 105 and/or at particular times, according to media content 110 posted in a particular category at a particular website, etc. Further, as discussed above, the media device 140 could use information in metadata 120, e.g., identifying a type of event, teams playing, news figures being reported on, etc. to determine whether to review interest data 125 in an item of media content 110.

Following the block 305, next, in a block 310, the recording module 145 checks interest data 125 in the media content 110 metadata 120. If the interest data 125 triggers a predetermined interest level, e.g., meets or exceeds a predetermined threshold and/or includes predetermined tags or keywords, then the process 300 proceeds to a block 320. Otherwise, the process 300 proceeds to a block 315.

As mentioned above, a user could use a GUI of the media device 140 to specify a predetermined threshold and/or tags, keywords, etc. used to trigger an identification of an interest level for recording a clip 155. However, the predetermined threshold could also be specified at the media source 105 and downloaded by the recording module 145. Further, it is possible that interest data 125 could indicate that an entire item of media content 110, e.g., an entire football game, has an interest level for a user such that the entire item of media content 110, e.g., a football game, political speech, etc., should be recorded, i.e., a single clip 155 that includes the entire item of media content 110 may be generated.

Further, the recording module 145 may make use of rules 150 in determining whether interest data 125 triggers recording of a clip 155. For example, as mentioned above, a rule 150 could specify an interest data 125 threshold to be met or exceeded for a particular type of media content item 110, e.g., a football game, and/or for an attribute of a type of media content item 110, e.g., the data 125 threshold could be varied according to the presence or absence of a particular football team in the media content item 110. As also mentioned above, the recording module 145 could use a rule 150 to determine whether to examine interest data 125 in an item of media content 110.

The block 320 is executed if it is determined that an interest level has been triggered in the block 310. In the block 320, the recording module 145 records a portion of media data 115 in the item of media content 110 for which it is determined that the interest level has been triggered. For example, the recording module 145 could begin recording frames in an MPEG stream of media data 115 when reaching a frame that was indicated to have an interest level at or above the predetermined threshold, and could then complete recording when reaching a frame for which the interest data 125 indicated was associated with an interest level below the predetermined threshold. These recorded frames of media data 115 are then included in a clip 155.

Following the block 320, in a block 325, the recording module 145 stores the portion of media data 115 captured in the block 315 as a clip 155. In general, the recording module 145 includes metadata in the clip 155 that may be copied or derived from the metadata 120 included in the item of media content 110. For example, a program or event name may be provided, and interest level, e.g., an excitement level, could be specified, and other attributes of the media content item 110 from which the clip 155 was taking could be indicated, e.g., a sport or news event, teams and/or individuals featured in the clip 155, etc. Further, the clip 155 may be made available to a user in a variety of ways. For example, a GUI provided by the media device 140 could display a list of clips 155 generated within a specified period of time. The clips 155 could be displayed according to various organizational criteria, such as subject matter (e.g., football, hockey, political speeches, etc.), interest levels (e.g., more exciting clips 155 listed ahead of less exciting clips 155), etc.

Further, the module 145 could include instructions to assemble clips 155 into a composite presentation of media content 110, i.e., a presentation of media content 110 including clips 155 taken from one or more items of media content 110 received from a media source 105. For example, the module 145 could assemble clips 155 according to a one or more attributes, e.g., subject of the clip 155, excitement level of the clip 155, etc., e.g., football plays having a high excitement level, or even a particular kind of football play, e.g., kickoff returns, having a high excitement level. Such composite presentations of clips 155 could then be made available in a GUI provided by the device 140, e.g., listed according to a description of attributes in the clip 155, e.g., excitement level, subject matter, etc.

A block 315 may follow either the block 310 or the block 325. In the block 315, the recording module 145 determines whether content 110 continues to be received in the media device 140. If so, the process 300 returns to the block 305. Otherwise, the process 300 ends following the block 315.

Conclusion

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A computing device that includes a processor and a memory, the device programmed to:
   identify a media content stream for examining by the computing device;
   receive the media content stream and while the media content stream is being received:
examine the media content stream based on a rule;
determine that a first value in metadata corresponds to a parameter indicating interest specified by the rule;
determine a threshold based on the parameter indicating interest according to the rule, wherein the parameter indicating interest includes an attribute of the media content type; and
for each of a plurality of successively received portions of the media content stream, perform the steps of:
determining whether a second value in metadata of the media content stream relating to an indicia of interest in the portion of the media content stream meets or exceeds the threshold; and
responsive to a determination that the second value meets or exceeds the threshold, automatically storing a first clip including the portion of the media content stream, whereby the first clip is made available for later retrieval;
wherein the indicia of interest comprises a numerical rating independent of preferences of any single user and made available to a plurality of users.

2. The device of claim 1, wherein the indicia of interest is subjective.

3. The device of claim 1, further programmed to automatically store, along with the first clip, one or more additional clips, thereby creating a composite clip.

4. The device of claim 3, further configured to automatically arrange the first clip and one or more additional clips according to the indicia of interest.

5. The device of claim 1, further programmed to display a graphical user interface including a link to the first clip.

6. The device of claim 1, wherein the media content stream comprises a live broadcast and the indicia of interest is generated in real time or near real time.

7. The device of claim 1, wherein the parameter indicating interest is based on data from an account associated with a user on a remote site.

8. A computing device that includes a processor and a memory, the device programmed to:
identify a media content stream for examining by the computing device;
receive the media content stream; and
while the media content stream is being received:
examine the media content stream based on a rule;
determine that a first value in metadata corresponds to a parameter indicating interest specified by the rule;
establish, based on the rule, a numerical threshold value for a value representing an indicia of interest in the media content stream based on the parameter indicating interest, the indicia of interest being included in metadata for the media content stream; and
for each of a plurality of successively received portions of the media content stream, perform the steps of:
determining whether the indicia of interest meets or exceeds the threshold value;
identifying a portion of the media content stream associated with the indicia of interest; and
responsive to a determination that the indicia of interest meets or exceeds the threshold, automatically storing a first clip including the portion of the media content stream, whereby the first clip is made available for later retrieval;
wherein:
the indicia of interest comprises a subjective numerical rating independent of the preferences of any single user and made available to a plurality of users;
the rule specifies a parameter indicating interest in the clip in addition to the indicia, wherein the parameter is associated with a particular user; and
establishing the numerical threshold is based at least in part on the parameter indicating interest.

9. The device of claim 8, wherein the media content stream comprises a live broadcast and the indicia of interest is generated in real time or near real time.

10. The device of claim 8, further configured to automatically store, along with the first clip, one or more additional clips, thereby creating a composite clip.

11. The device of claim 10, further configured to automatically arrange the first clip and one or more additional clips according to the indicia of interest.

12. The device of claim 8, further configured to display a graphical user interface including a link to the first clip.

13. A computing device that includes a processor and a memory, the device programmed to:
identify a media content stream for examining by the computing device;
receive the media content stream; and
while the media content stream is being received:
examine the media content stream based on a rule;
determine that a first value in metadata corresponds to a parameter indicating interest specified by the rule;
determine a threshold based on the parameter indicating interest according to the rule, wherein the parameter indicating interest includes an attribute of the media content type; and
for each of a plurality of successively received portions of the media content stream, perform the steps of:
determining whether a second value in metadata of the media content stream relating to an indicia of interest in a portion of the media content stream meets or exceeds a threshold based on the parameter of interest according to the rule;
responsive to a determination that the second value meets or exceeds the threshold, automatically storing a first clip including the portion of the media content stream, whereby the first clip is made available for later retrieval;
wherein:
the indicia of interest comprises a numerical rating independent of preferences of any single user and made available to a plurality of users;
the media content stream comprises a live broadcast; and
the indicia of interest is generated in real time or near real time.

14. The device of claim 13, wherein the indicia of interest is subjective.

15. The device of claim 13, further programmed to store, along with the first clip, one or more additional clips, thereby creating a composite clip.

16. The device of claim 13, further programmed to display a graphical user interface including a link to the first clip.

* * * * *